Feb. 10, 1948.     D. McNICOLL     2,435,839
TAPER ROLLER BEARING AND CAGE

Filed June 6, 1946

INVENTOR:
David McNicoll
BY Carr Marr Gravely
His ATTORNEYS

Patented Feb. 10, 1948

2,435,839

UNITED STATES PATENT OFFICE 2,435,839

TAPER ROLLER BEARING AND CAGE

David McNicoll, Birmingham, England, assignor to The Timken Roller Bearing Company, Canton, Ohio, a corporation of Ohio Application June 6, 1946, Serial No. 674,705
In Great Britain December 24, 1945

7 Claims. (Cl. 308—214)

1

This invention relates to taper roller bearings and roller-spacing cages therefor.

One of the objects of the present invention is to provide a self-contained bearing assembly, comprising the inner and outer bearing members together with the rollers and cage, which, can be handled as a unit without the component parts becoming separated, but in which the said parts can, when desired, be readily separated or removed, as during assembly or for replacement or repair.

Another object is to provide a bearing assembly in which the rollers are retained in place upon the inner member when the outer bearing member is removed.

A further object is to provide an improved construction of roller-spacing cage which can co-operate with the inner and outer bearing members and with the rollers, so as to produce a self-contained unit bearing assembly, but which will allow of the separation or removal of the component parts when required; and which can be cheaply produced.

According to the invention, a taper-roller bearing assembly forming a self-contained unit comprises an inner bearing member or cone, an outer bearing member or cup, taper rollers between said members, and a roller cage having at one end a flange or ring overhanging the larger end of the inner bearing member and having the other end formed so as to be releasably interlocked with the outer member.

Also, according to the invention, a taper-roller bearing assembly comprises an inner bearing member or cone having an outstanding annular rib or flange at the larger end, an outer bearing member or conical cup, taper rollers disposed between said members so that their larger ends co-operate with said rib or flange, and a roller cage having at one end a flange or ring overhanging the larger end of the inner bearing member and having the other end formed so as to be releasably interlocked with the outer bearing member. The releasable interlocking connection between the cage and the outer member may be effected by providing the cage with resilient roller-spacing arms adapted to engage or interlock with said outer member by a spring snap action when the outer member is moved axially into position over the rollers.

Also, according to the invention, a cage for a taper-roller bearing comprises at one end a ring or annular flange, adapted to overhang the larger end of the inner bearing member, and carrying spring roller-spacing arms having free ends turned up to form lips or catch parts adapted releasably to engage or interlock with the outer bearing member.

Figure 1 of the accompanying drawings is a horizontal section through a bearing assembly in accordance with the invention.

Figure 1:
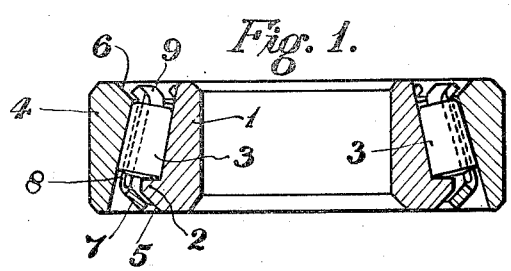
Figure 2:
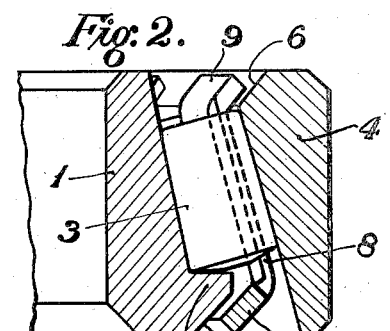
Figure 2 is a section through one side of the bearing on a larger scale.
Figure 3:
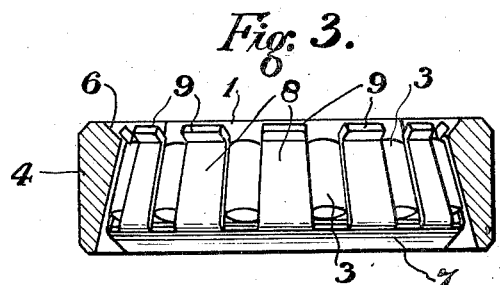
Figure 3 is a section through the outer bearing member showing the cage and rollers in plan.

Referring to Figures 1 to 6 of the said drawings, the self-contained single-row bearing assembly therein shown comprises an annular inner member or cone 1 having a conical race surface and an outstanding annular rib or flange 2 at the larger end thereof; taper rollers 3 on said member or cone 1 with their larger ends opposed to and co-operating with the rib or flange 2; and an outer bearing member or cup 4 having an internal conical race surface engaging the rollers. The larger end of the inner bearing member 1 is externally bevelled around the outer wall of the rib or flange, at 5, and, at the opposite end of the bearing, the larger end of the outer bearing member 4 is interiorly bevelled to form a circumferential internal bevel or conical surface 6 making an obtuse angle with the interior race surface of said member.

Figure 5:
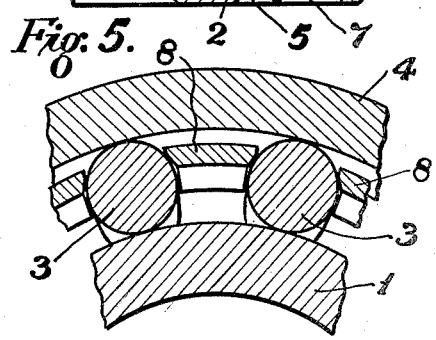
Figure 5 represents a longitudinal vertical section through a portion of the bearing.
Figure 4:
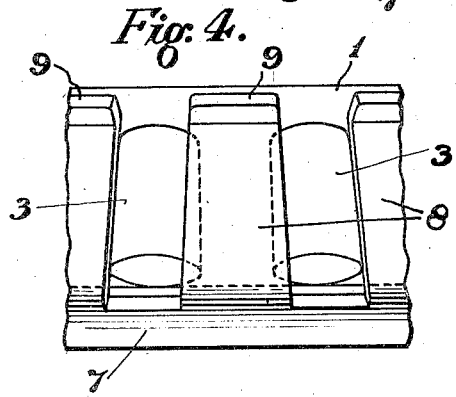
Figure 4 is a fragmentary plan view of a portion of the cage, on a larger scale.

The rollers 3 are spaced apart by means of a cage consisting of a ring or annular flange 7 at one end carrying a series of circumferentially-spaced spring arms 8 extending from the ring in conical formation and passing between the rollers substantially parallel to the race surface of the outer bearing member 4. The spaces between the arms 8 form roller-receiving pockets, their edges being bevelled or shaped, as shown in Figure 5, so as approximately to conform to the surfaces of the rollers, and their width, at the outside, being rather less than the maximum width of the rollers, so that the latter cannot fall out when the outer bearing member is removed. The pockets may slightly taper towards the free ends of the arms, or their sides may be parallel, but the width across their open ends is such that the ends of the arms normally retain the rollers within the pockets but can be sprung outwards and apart by endwise force applied to the rollers to allow of the removal of said rollers when necessary.

The cage ring or flange 7 which carries the spring arms 8 is of conical form, corresponding to the exterior bevelled surface 5 on the larger end of the inner bearing member, and it overhangs and mates or lies parallel with this bevelled surface. The free outer ends of the spring arms 8 are bent upwards or outwards to form lips or catch parts 9 which make obtuse angles with the arms; and they overlap and lie parallel to the bevelled surface 6 at the larger end of the outer bearing member 4.

In this manner the cage co-operates with the inner and outer bearing members to form a self-contained bearing assembly which can be handled as a unit without the component parts becoming separated. If, however, sufficient axial force is applied to the outer bearing member its bevelled end surface 6 will depress the catch parts 9 of the cage arms 8 sufficiently to clear said surface, and the said bearing member can then be removed. The rollers 3, the cage and the inner bearing member 1 still form a self-contained unit, but, if desired, the rollers can be removed by exerting sufficient endwise pressure upon them to cause the free ends of adjacent cage arms to be sprung slightly outwards and apart, as hereinbefore described.

When re-assembling the bearing, and the outer bearing member 4 is moved axially over the rollers, the interior conical surface of this member co-operates with the catch ends 9 of the cage arms to depress the same until the said catch ends finally re-expand and overlap or interlock with the bevelled end surface 6 of said bearing member with a snap action.

Figure 6:
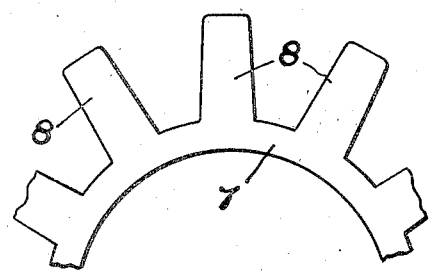
Figure 6 shows a portion of the blank from which the cage is made.

The cage is conveniently made from a flat sheet-steel blank as shown in Figure 6, the same consisting of a ring 7 having around its outer circumference a series of outwardly-extending radial arms 8 suitably spaced apart and of a shape corresponding to the arms of the cage. The blank is placed in a press and, by means of one or more operations, is fashioned to the desired conical cup form of the cage, with their ends bent up to form the catch parts, as hereinbefore described.

Figure 7:
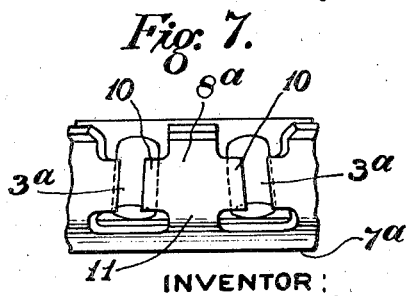
Figure 7 is a fragmentary view showing a portion of a slightly modified form of cage.

If desired, and as shown in Figure 7, the spring arms 8$^a$ of the cage may have at opposite sides lateral wings 10 having their edges bevelled or shaped to engage and overlap the rollers 3$^a$. The arms 8$^a$ are joined to the end ring 7$^a$ by neck portions 11, thus forming pockets of substantially H-shape.

Figure 8:
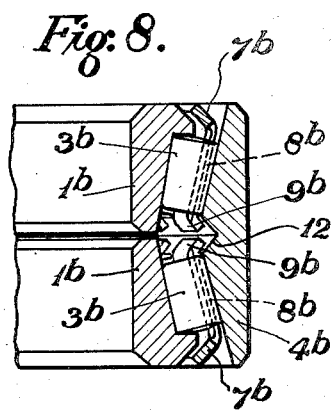
Figure 8 shows the application of the invention to a double-row bearing.

The invention may be applied to double-row bearings as shown in Figure 8. Thus, there are two rows of rollers 3$^b$ running between conical raceways on a single outer bearing member or double cup 4$^b$ and two separate cones or inner bearing members 1$^b$, 1$^b$; and the rollers of the two rows are separated by independent cages each constructed as hereinbefore described, namely, consisting of a ring 7$^b$ overhanging the outer and larger end of the corresponding cone 1$^b$ and carrying spring arms 8$^b$ having their ends bent upwards to form catch parts 9$^b$. These catch parts are adapted to be sprung into interlocking engagement with a V-shaped annular recess or groove 12 formed around the interior of the outer bearing member 4$^b$ at the middle thereof.

I claim:

1. A taper-roller bearing comprising a conical inner bearing member, an outer bearing member, taper rollers between said members and a roller cage having at one end a flange overhanging the larger end of the inner bearing member and having the opposite end formed so as to be releasably interlocked with the outer member, the whole forming a self-contained unit assembly.

2. A taper-roller bearing assembly comprising a conical inner bearing member having an outstanding annular rib at the larger end, an outer bearing member having a conical race surface, taper rollers disposed between said members so that their larger ends co-operate with said rib, and a roller cage having at one end a flange overhanging the larger end of the inner bearing member and having the other end formed so as to be releasably interlocked with the outer bearing member.

3. A taper-roller unit bearing assembly comprising a conical inner bearing member, an outer bearing member, taper rollers between said members and a roller cage consisting of an end ring overhanging the larger end of the inner bearing member and carrying resilient roller-spacing arms the ends of which releasably engage and interlock with the outer bearing member by a spring snap action when said outer member is moved axially into position over the rollers.

4. A taper-roller unit bearing assembly comprising an inner cone having an outstanding annular rib at the larger end, an outer conical cup member, taper rollers disposed between the cone and cup member so that their larger ends co-operate with said rib, and a roller cage consisting of an end ring overhanging the larger end of the cone and carrying resilient roller-spacing arms the ends of which releasably engage and interlock with the cup member by a spring snap action, the whole forming a self-contained unit.

5. A taper-roller bearing assembly comprising an inner cone, an outer cup, taper rollers between the cone and cup, and a roller cage consisting of an end ring overhanging the larger end of the cone and carrying spring roller-spacing arms having free ends turned up to form lips constituting catch parts which engage and interlock with the cup by a spring snap action.

6. A taper-roller unit bearing assembly comprising an inner cone having an outstanding annular rib at the larger end, an outer conical cup member, taper rollers disposed between the cone and cup member so that their larger ends co-operate with said rib, and a roller cage consisting of an end ring overhanging the larger end of the cone and carrying resilient roller-spacing arms lying substantially parallel to the race surface of the cup, said arms having free ends shaped to form catch parts adapted to engage and interlock with the cup member by a spring snap action, and the width between the free ends of the arms being such that the said ends normally retain the rollers but can be sprung apart by endwise force applied to the rollers to allow of the removal of said rollers.

7. A double-row taper-roller bearing assembly comprising two inner cones having ribs at their outer larger ends, an outer bearing member having conical race surfaces and an annular recess between said surfaces, two rows of taper rollers disposed between said cones and outer bearing member so that their larger ends co-operate with the respective ribs of the cones, and two roller cages, one for each row of rollers, each consisting of an end ring overhanging the larger end of a cone and carrying resilient roller-spacing arms having free ends shaped to form catch parts adapted to engage and interlock with the annular recess in the outer bearing member by a spring snap action.

DAVID McNICOLL.

REFERENCES CITED

The following references are of record in the file of this patent:

UNITED STATES PATENTS

| Number | Name | Date |
|---|---|---|
| 1,518,731 | Dickinson | Dec. 9, 1924 |
| 1,941,460 | Boden | Jan. 2, 1934 |